United States Patent
Michaelsen et al.

(10) Patent No.: US 7,178,593 B2
(45) Date of Patent: Feb. 20, 2007

(54) PIGGABLE SEPARATION SYSTEM AND METHOD

(75) Inventors: Jarle Michaelsen, Spikkestad (NO); Lars-Petter Sollie, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 356 days.

(21) Appl. No.: 10/891,620

(22) Filed: Jul. 15, 2004

(65) Prior Publication Data

US 2005/0011647 A1    Jan. 20, 2005

Related U.S. Application Data

(60) Provisional application No. 60/488,546, filed on Jul. 18, 2003.

(51) Int. Cl.
*E21B 37/00* (2006.01)

(52) U.S. Cl. .................. 166/267; 166/311; 166/86.3; 166/91.1; 166/75.12; 210/390; 210/802; 210/748; 210/522; 405/184.1; 134/8; 137/550

(58) Field of Classification Search ............... 166/267, 166/311, 85.1, 86.3, 80.1, 82.1, 91.1, 75.12; 210/390, 802, 748, 522; 405/184.1; 134/8; 204/660–674, 559–570; 137/550
See application file for complete search history.

(56) References Cited

U.S. PATENT DOCUMENTS

| | | | | |
|---|---|---|---|---|
| 2,764,173 A | * | 9/1956 | Renner | 137/550 |
| 4,056,474 A | | 11/1977 | Snouffer | |
| 4,314,577 A | * | 2/1982 | Brister | 137/13 |
| 4,448,247 A | * | 5/1984 | Reed | 166/85.1 |
| 5,368,705 A | * | 11/1994 | Cassidy | 210/748 |
| 5,762,810 A | * | 6/1998 | Pelton et al. | 210/802 |
| 6,678,954 B2 | * | 1/2004 | De Almeida | 405/184.1 |
| 6,802,909 B1 | * | 10/2004 | Crenshaw | 134/8 |

* cited by examiner

*Primary Examiner*—David Bagnell
*Assistant Examiner*—Matthew J. Smith
(74) *Attorney, Agent, or Firm*—Bracewell & Giuliani LLP

(57) ABSTRACT

An inline well fluid separator is movable for pigging operations. The separator assembly has a housing with an inlet port and an outlet port. A separation unit is carried within the housing. The separation unit has an operational position in alignment with the ports to cause well fluid to flow through the separation unit. The separation unit will move to a storage position within the housing outside of the flow path to enable a pipeline pig to pass.

23 Claims, 4 Drawing Sheets

PIGGABLE SEPARATION SYSTEM AND METHOD

This application claims the benefit of U.S. Provisional Application Ser. No. 60/488,546, filed Jul. 18, 2003 entitled "Piggable Separation System".

FIELD OF THE INVENTION

This invention relates in general to oil and gas processing systems, and in particular to an inline coalescing separator that allows pigs to pass through for cleaning.

BACKGROUND OF THE INVENTION

Hydrocarbon wells typically produce a percentage of water along with the hydrocarbon fluids, which may be oil or gas. A variety of separators exist for separating the water from the hydrocarbon, operating on principles such as gravity separation, centrifugal separation, and vortex separation.

A more recent type of separation unit, called a coalescing filter, comprises a plurality of tubes mounted in a cylinder parallel to the flow. The tubes are electrically conductive and insulated from the plate. The operator supplies a voltage to the tubes. Dipolar water droplets contained in the oil phase are oriented by an electrostatic field from the voltage in the tubes in a way that makes them collide or coalesce with each other. This effect causes water within the well fluid to form into larger water droplets. Larger water droplets generally move and separate faster than smaller droplets, reducing the retention time to remove water from oil in gravity separation. The well fluid normally flows from the coalescence unit to a second stage for more separation.

A second stage could be another coalescence unit or it could be a unit of a different type, such as a gravity unit, a centrifugal unit, a vortex unit, or a dielectrophoresis unit. A dielectrophoresis unit also uses a high voltage electrostatic field, however the field is configured to force the water droplets into designated sections of the unit and thereby form streams of water. Electrodes in the form of undulating sheets are used. The electrode sheets are closely spaced and arranged side-by-side to define constrictive passage portions and widened passage portions. The passages formed by the sheets force the water droplets to move towards the stronger section of the electrostatic field, which is at the narrower portions. The forces imposed by the electrostatic field guide the water droplets into these predetermined passage portions, where they form high water content sections of liquid that will easily separate immediately downstream of the unit.

Regardless of the type, typically, the separators are part of a processing system located near the well site. In the case of subsea wells, the operator normally places the processing equipment on a platform, which may be either fixed leg or floating. In a few instances, separators have been placed in a subsea location, which may reduce the distance that the well fluid has to be pumped, and the distance that the separated water has to be pumped before being injected into a water injection well. Coalescing filters can be sized small enough to be placed within subsea flow lines to enhance subsea well fluid processing.

One problem that may arise, however, with a subsea processing system deals with cleaning the flow lines. Well fluids often contain substances, such as paraffin, that coat the interior of the flow lines. A variety of processes exist for removing the coating, including the use of chemicals and mechanical cleaning. In mechanical cleaning, the operator may utilize a pipeline pig, which is a cylindrical member that fits sealingly within the flow line. The body of the pig has scraper elements to scrape and remove the coating. The operator applies fluid pressure to the opposite end of the pig to cause it to flow through the flow line to perform the cleaning operation.

A separation unit typically would not be configured to accept a pig, particularly a coalescence unit because it comprises a large number of small diameter tubes mounted parallel to the flow. For a subsea separation unit of this type, a bypass line with control valves would need to be provided. Constructing a bypass line would add to the expense and maintenance of a subsea processing installation.

SUMMARY OF THE INVENTION

In this invention, a separation unit is mounted within a housing. The housing has inlet and outlet ports that couple the housing inline with a flow line. The separation unit is movable between an operational position in the flow path between the inlet and outlet ports to a storage position outside of the flow path to enable a pipeline pig to be pumped through the ports and the housing.

In one embodiment, the separation unit pivots about a pivot point when moving from the operational phase to the storage position. An actuator causes the movement from the storage position to the operational position. The actuator may comprise a spring that continuously urges the separation unit to the storage position. The pipeline pig will contact the separation unit as it is being pumped through the flow line, compressing the spring and swinging the separation unit out of the flow path. In another embodiment, the actuator is a powered energizer that strokes the separation unit between the operational and storage positions.

In still a further embodiment, the actuator moves the separation unit along a path that is perpendicular to the well fluid flow path extending through the housing. In this embodiment, the separation unit is preferably mounted in a gate that has an aperture that aligns with the inlet and outlet ports while the separation unit is in a storage position.

A sleeve may be mounted between the ports to form a tubular bridge for the pipeline pig. The sleeve moves axially to disengage one end from one of the ports and provide room for the separation unit to move to the operational position. While the separation unit is in the storage position, the sleeve engages both of the ports to provide a tubular bridge for the pig to pass through.

The separation unit could be of different types, but preferably comprises a coalescing filter. The filter has a plurality of electrically conductive tubes that are mounted to a carrier plate. An electrical source provides voltage to the tubes to perform the coalescing step as the well fluid flows through the tube.

DETAILED DESCRIPTION OF THE INVENTION

Figure 1:
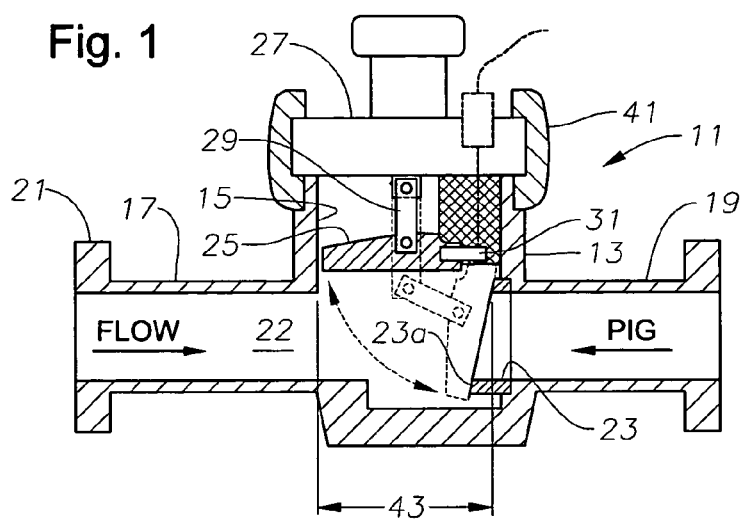
FIG. 1 is a schematic sectional view of an inline coalescing unit.

Referring to FIG. 1, inline coalescing unit 11 is an oil/water separator adapted to be connected into a flow line leading to additional separation equipment. Inline coalescing unit 11 has a housing or body 13 with a central cavity 15. An upstream flow line connector or inlet port 17 joins cavity 15 perpendicular to an axis of cavity 15. A downstream flow line connector or outlet port 9 also joins cavity 15 coaxial with upstream flow line connector 17. Each flow line connector 17, 19 has a flange 21 for coupling to a flow line (not shown). As will be appreciated by those skilled in the art, flange 21 can be replaced with any other device for coupling a flow line. A passage 22 extends in a straight line from flow line connector 17, through cavity 15 and out flow line connector 19. Preferably, the inner diameters of the flow line connectors 17, 19 are the same. A cylindrical projection equal to the inner diameters of flow line connectos 17, 19 extends through cavity 15.

A seat ring 23 is shown mounted on the downstream side of cavity 15 surrounding the junction of cavity 15 with passage 22. Seat ring 23 has a hole that has the same diameter as passage 22. Seat ring 23 is coaxial with passage 22 about a longitudinal axis. Seat ring 23 has an inclined upstream face 23a in this embodiment. The lower side of seat ring 23 is thicker than the upper side in this embodiment, however, the upstream face 23a could be perpendicular to the axis of passage 22, rather than inclined.

A flapper 25 moves from a storage position, shown in FIG. 1 by the solid lines, to an engaged position shown by the dotted lines. In the storage position, flapper 25 is located outside of the cylindrical projection passing between flow line connectors 17, 19 through cavity 15. Preferably, flapper 25 is a circular disc, and in the engaged or operational position, flapper 25 abuts face 23a, but sealing is not required. As desired, flapper 25 can be in different shapes like rectangular or square, depending on the cross-section of passage 22. An actuator 27 moves flapper 25 to the engaged position. Actuator 27 may comprise a spring that continuously biases flapper 25 to the engaged position. Alternately, actuator 27 may comprises a powered unit that moves flapper 25 between the engaged and storage positions. Actuator 27, which could be mechanical or hydraulic, strokes a link member 29 upward and downward. This movement causes flapper 25 to pivot about arms 31 that connect it to a portion of actuator 27.

Figure 2:
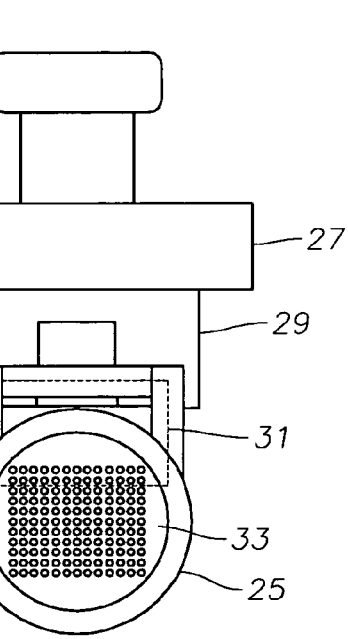
FIG. 2 is a schematic side view of the coalescing unit of FIG. 1, showing the coalescer removed from its housing.
Figure 4:
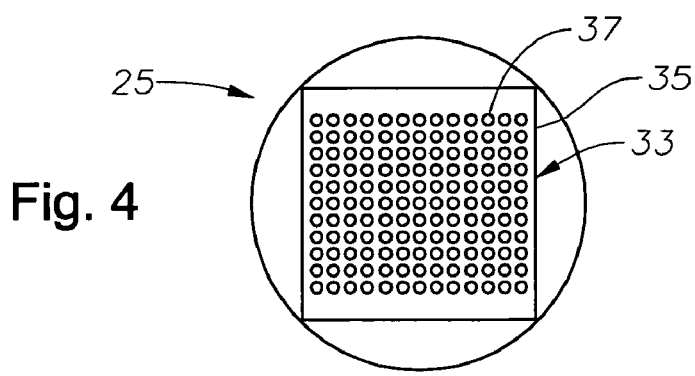
FIG. 4 is a front view of the flapper of the coalescing unit of FIG. 1, showing the coalescer tubes.

Referring to FIGS. 2 and 4, flapper 25 is part of a separator that assists in separating water from oil. In the preferred embodiment, the separator comprises a coalescing unit 33, although other types are feasible. Coalescer 33 is mounted within flapper 25 and includes an insulation plate 35 that provides electrical insulation. A plurality of electrically conductive tubes 37 are mounted to insulation plate 35, each extending parallel to the longitudinal axis of flow line 22. Wires 39 (FIG. 2) connect each tube 37 to an electrical power supply for providing voltage. Wires 39 pass through arm 31 to the exterior.

The voltage causes an electrostatic field to be applied to the oil and water mixture at tubes 37. By exposing the mixture of water and oil to an electrostatic field, dipolar water droplets contained in the oil phase will be oriented in a way that makes them collide or coalesce with each other. This causes the water droplets to grow to bigger droplets. Generally, bigger droplets move and separate faster than smaller droplets. Consequently, coalescer 33 serves as a preliminary stage in the separation of water from oil. Alternatively it may be an independent process.

Figure 3:
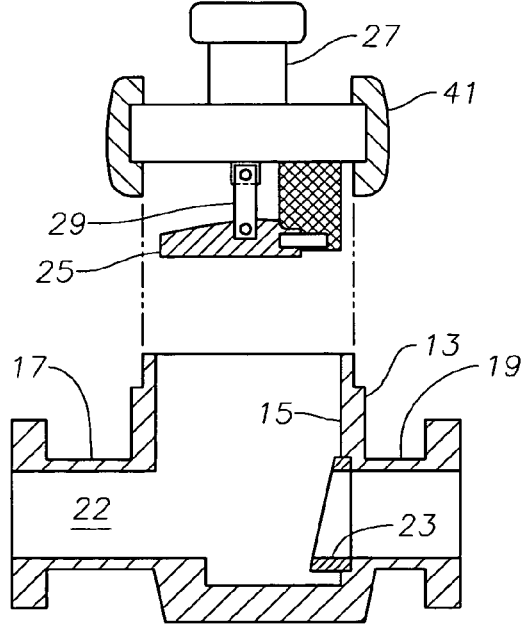
FIG. 3 is a schematic sectional view of the coalescing unit of FIG. 1, with the coalescer shown being lifted from its housing

Actuator 27 is secured by clamps 41 to the upper end of body 13. Clamps 41 may be actuated remotely in the event of a subsea environment by a remote operated vehicle. Releasing clamps 41 allows actuator 27 and flapper 25 to be pulled from housing 13 for maintenance as illustrated in FIG. 3.

In the engaged or operational position, flapper 25 will be in engagement with seat ring face 23a. However, it need not seal because the fluid flowing through passage 22 will flow through tubes 37 mounted in flapper 25. The electrostatic field applied to tubes 37 causes the water droplets to grow in size for further separation downstream.

For pigging operations through passage 22, the pig (not shown) is typically pumped in the direction indicated by the arrow in FIG. 1 to clean the flow lines. If actuator 27 comprises a spring, rather than being powered, the pig would bump into flapper 25 and push it to the storage position shown in FIG. 1 as it proceeds past. An optional latch (not shown) could lock flapper 25 in the storage position as the pig passes, then release flapper 25 once the pig has passed. If actuator 27 is externally powered, the operator supplies power, such as hydraulic pressure, to cause actuator 27 to lift link 29, which rotates flapper 25 to the storage position. In the storage position, flapper 25 is located within cavity 15 above passage 22 and in a generally horizontal position. This storage position allows the pig to pass freely through flow line connectors 17, 19.

Numeral 43 in FIG. 1 indicates a distance from the downstream side of body 13 to the upstream side at a point where flapper 25 is located. Distance 43 must be bridged by the pig as it is being pumped through flow line passages 22. A pump-through pig relies on annular seals that sealingly engage the walls of passages 22. The seal or seals cannot seal while traversing the bridging distance 43. The seals of a typical pig may not be spaced apart sufficiently to allow the pig to traverse bridging distance 43. For example, if there is only a single pig seal with a width less than bridging distance 43, the pig would become unsealed while located in bridging distance 43, ceasing movement.

Figure 5:
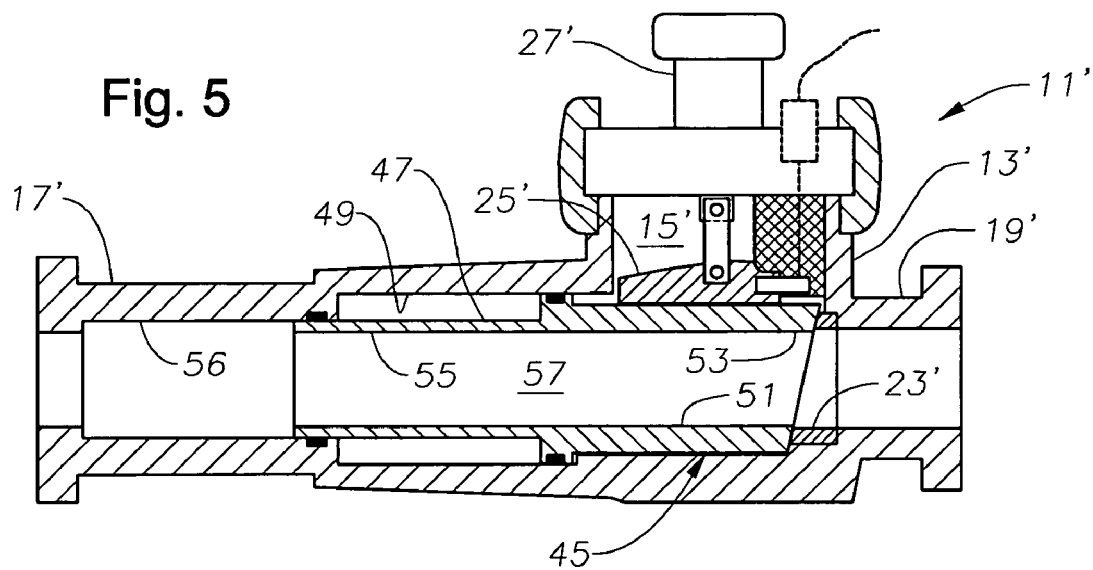
FIG. 5 is a schematic sectional view of an alternate embodiment of an inline coalescing unit, with a bridge sleeve shown in an engaged position.
Figure 6:
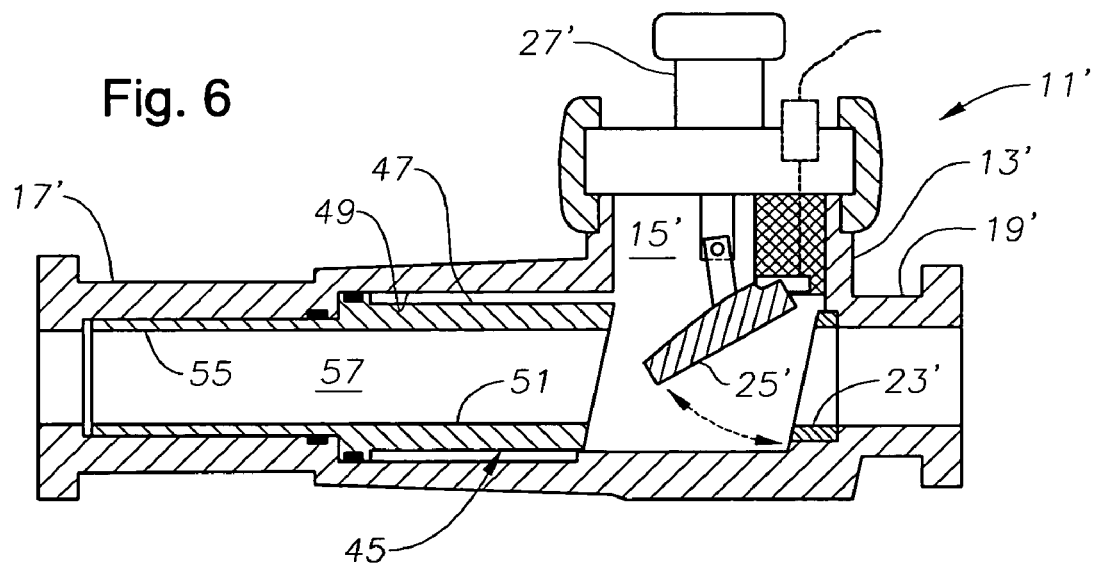
FIG. 6 is a sectional view of the coalescing unit of FIG. 5, showing the bridge sleeve in a storage position.

In order to overcome this particular limitation on bridging distance 43, FIGS. 5 and 6 illustrate an alternate embodiment. In this embodiment, actuator 27' and flapper 25' are constructed as in the first embodiment. Both are located within cavity 15' of body 13'. The downstream flow line connector 19' may be the same as in the first embodiment. Upstream flow line connector 17', however, is configured to receive a reciprocating bridge sleeve 45.

Bridge sleeve 45 has a piston 47 that is carried in an enlarged bore portion 49 of flow line connector 17'. Hydraulic fluid is supplied to selectively stroke bridge sleeve 45 from the engaged position shown in FIG. 5 to the storage position shown in FIG. 6. Piston 47 is an annular member integrally formed on the outer diameter of bridge sleeve 45. Bridge sleeve 45 has an enlarged outer diameter downstream end portion 51 that extends from piston 47 to a downstream end 53. Downstream end 53 is inclined to mate flush with the upstream face of seat ring 23'. A reduced outer diameter end portion 55 extends in an upstream direction from piston 47 within an upstream bore portion 56. Bore portion 56 is smaller in diameter than enlarged bore portion 49 but slightly larger in diameter than the flow lines (not shown) that connect to inline coalescer 11'. A bore 57 of uniform diameter that is the same diameter as the flow line extends completely through bridge sleeve 45.

While bridge sleeve 45 is in the engaged position of FIG. 5, a pig can readily pass through bores 56 and 57 while maintaining its seal. Flapper 25' will be in an upper storage position located above bridge sleeve 45. While bridge sleeve 45 is in the storage position, flapper 25' is back in engagement with seat ring 23' and bridge sleeve 45 is stroked to the left.

The embodiments of FIGS. 1–6 resemble a check valve. The embodiment of FIGS. 7–10 resembles a gate valve. Inline coalescing unit 59 has a body 61 that is tubular with flow line connectors 63 extending in opposite directions, parallel and coaxial with each other. Each flow line connector 63 connects to a flow line 65 for receiving and discharging the oil and water mixture.

Figure 7:
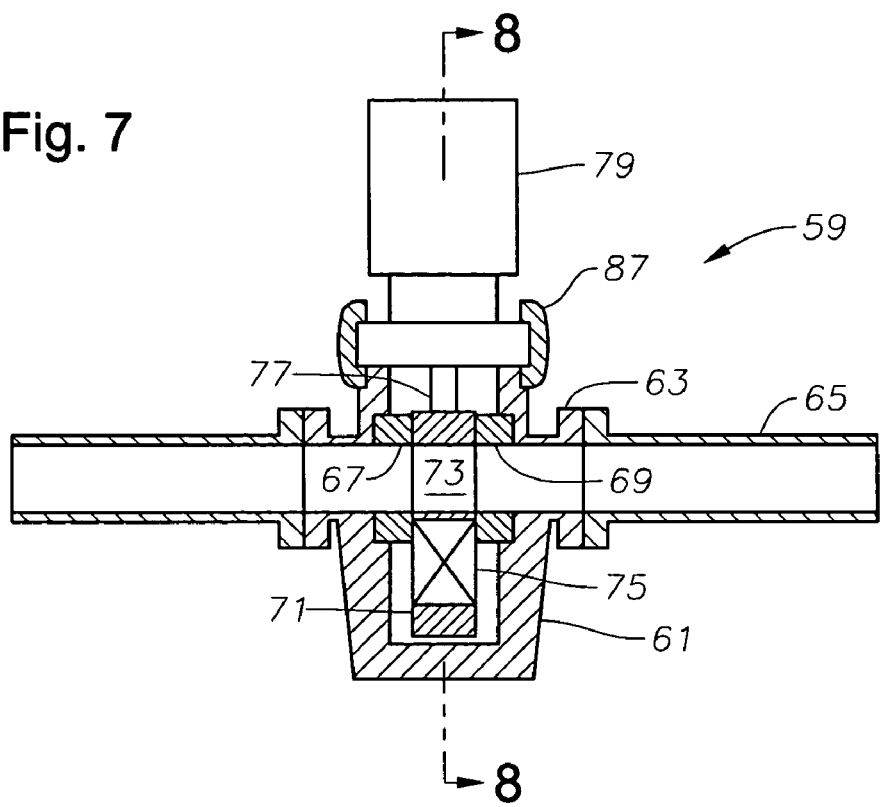
FIG. 7 is a schematic sectional view of another alternate embodiment of an inline coalescing unit.
Figure 8:
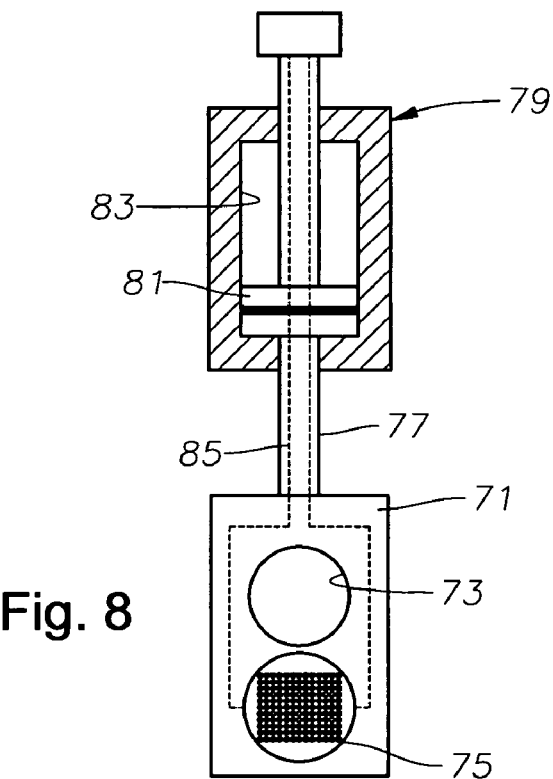
FIG. 8 is an enlarged schematic view of the coalescing unit of FIG. 7, taken along the line 8—8 and showing the coalescer removed from its housing.

In this embodiment, a pair of seat rings 67, 69 are utilized, each on an opposite side of the central cavity in body 61 at the junction with the bores of flow line connectors 63. A gate 71 moves vertically and slidingly between seat rings 67, 69. Gate 71 preferably has a passage 73 that is of the same diameter as the passages of flow line connectors 63. FIG. 7 shows the position that would be utilized for a pigging operation.

Figure 9:
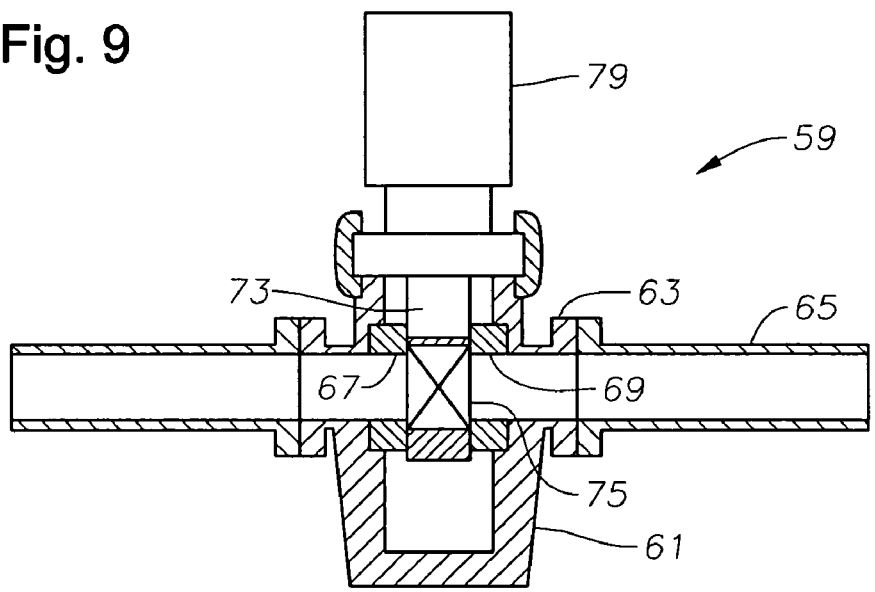
FIG. 9 is a sectional view of the coalescing unit of FIG. 7, shown in the engaged position.

A coalescer 75 is mounted in gate 71, also. In this embodiment, coalescer 75 is below passage 73, however it could alternately be above. Coalescer 75 may be the same as coalescer 33 of FIG. 2. An actuating stem 77 will selectively move gate 71 between the position shown in FIG. 7 and that shown in FIG. 9. In FIG. 9, coalescer 75 is located inline for processing the oil and water flowing through flow line 65. Actuating stem 77 is connected to an actuator 79, such as a linear motor or a piston 81, shown in FIG. 8. Piston 81 is stroked within a cylinder 83. Wires 85 for supplying power to coalescer 75 extend through actuator stem 77.

Figure 10:
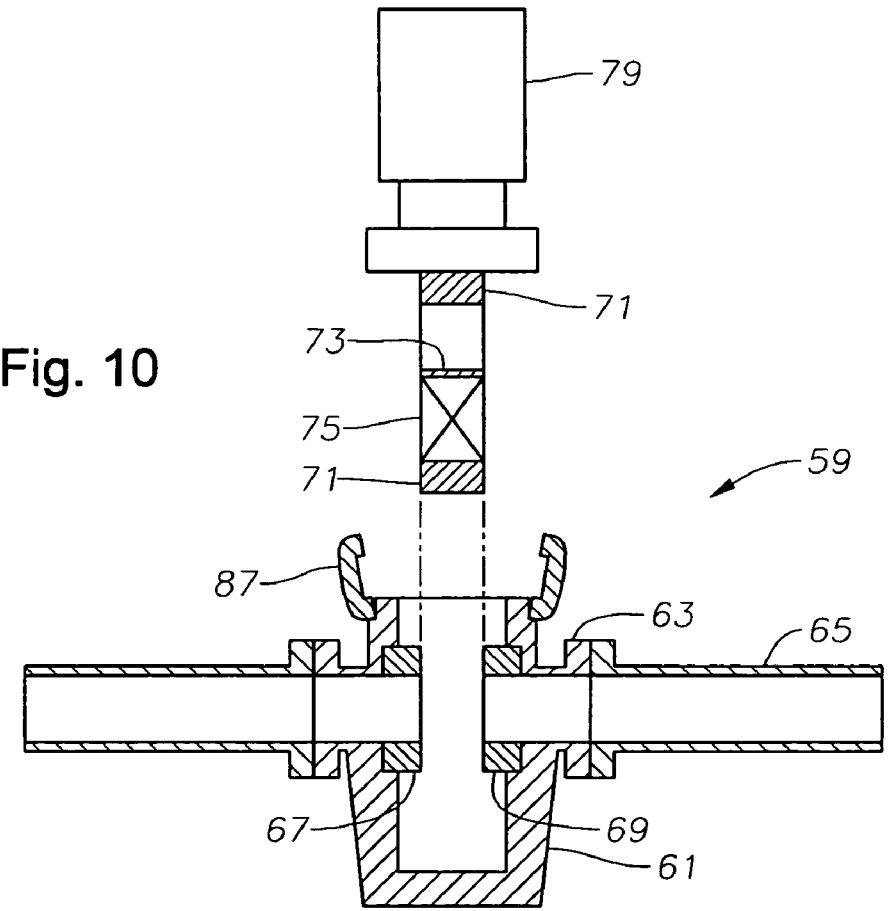
FIG. 10 is a sectional view of the coalescing unit of FIG. 7, with the coalescer shown being lifted from its housing.

FIG. 10 illustrates actuator 79 and gate 71 being retrieved. Opening clamps 87 allows retrieval of the components, leaving the seat rings 67, 69 in place.

The invention has significant advantages. The separation unit may be placed inline with flow lines. The operator can perform pigging operations without a bypass loop. The system operates remotely, thus is particularly applicable to subsea environments. In some embodiments, the separation unit may be retrieved readily for repair or replacement.

While the invention has been shown in only a few of its forms, it should be apparent to those skilled in the art that it is not so limited but susceptible to various changes without departing from the scope of the invention.

The invention claimed is:

1. An apparatus for use in separating water from hydrocarbon in well fluids, comprising:
 a housing having an inlet port and an outlet port for coupling the housing into a flow line;
 a separation unit in the housing for receiving well fluid and performing a processing step; and
 the separation unit being movable between an operational position in a flow path between the ports, and a storage position out of the flow path to enable a pipeline pig to be pumped through the ports and the housing.

2. The apparatus according to claim 1, wherein the separation unit comprises a coalescing filter.

3. The apparatus according to claim 1, wherein the separation unit comprises:
 a plate; and
 a plurality of electrically conductive tubes mounted to the plate for connection to an electrical source to perform a coalescing step on the water in the well fluid.

4. The apparatus according to claim 1, wherein the ports are coaxial and have substantially the same inner diameters, defining a cylindrical projection of the same inner diameter between the ports; and wherein
 the separation unit is located out of the cylindrical projection while in the storage position and within the cylindrical projection while in the operational position.

5. The apparatus according to claim 1, wherein the separation unit pivots about a pivot point when moving from the operational position to the storage position.

6. The apparatus according to claim 1, wherein the separation unit moves perpendicular to the inlet and outlet when moving from the operational position to the storage position.

7. The apparatus according to claim 1, further comprising:
 a sleeve mounted coaxially between the ports and having an inner diameter substantially the same as an inner diameter of the ports, the sleeve engaging both the ports to form a tubular bridge for receiving the pig while the separation unit is in the storage position;
 the sleeve being retractable wherein the sleeve separates from one of the ports while the separation unit is in the operating position.

8. An apparatus for use in separating water from hydrocarbon in well fluids, comprising:
 a housing having an inlet port and an outlet port for coupling the housing into a flow line, the ports being on a common axis and having substantially the same inner diameter, defining a cylindrical projection extending through the housing of the same inner diameter as the ports;
 at least one seat ring at a junction of the housing with one of the ports;
 a separation unit in the housing, the separation unit being a circular plate having a plurality of passages therethrough wherein well fluid flows and undergoes a hydrocarbon/water separation step; and
 the separation unit having an operational position with the passages in the plate within the cylindrical projection in engagement with the seat to cause well fluid flowing through the ports to pass through the passages; and
 the separation unit being movable to a storage position wherein the passages in the plate are spaced out of the cylindrical projection to enable a pig to be pumped through the housing.

9. The apparatus according to claim 8, wherein the passages comprise electrically conductive tubes electrically insulated from the plate for connection to an electrical source to perform a coalescing step on the water in the well fluid.

10. The apparatus according to claim 8, wherein the separation unit pivots about a pivot point when moving from the operational position to the storage position.

11. The apparatus according to claim 8, further comprising an actuator mounted to the housing and coupled to the plate for moving the plate perpendicular to the axis between the ports when moving from the operational position to the storage position.

12. The apparatus according to claim 8, further comprising:
- a sleeve mounted coaxially between the ports and having an inner diameter substantially the same as an inner diameter of the ports, the sleeve engaging both the ports to form a tubular bridge for receiving the pig while the separation unit is in the storage position;
- the sleeve being retractable to a position separated from one of the ports while the separation unit is in the operating position.

13. An apparatus for use in separating water from hydrocarbon in well fluids, comprising:
- a housing having a central chamber that is joined on opposite sides by an inlet port and an outlet port for coupling the housing into a flow line;
- a downstream seat ring at a junction between the chamber and the outlet port;
- a coalescing unit having a plurality of tubes for connection to a source of voltage to coalesce water droplets from well fluid flowing through the tubes;
- the coalescing unit being pivotally mounted in the chamber to a pivot point; and
- an actuator connected to the coalescing unit for moving the coalescing unit to an operational position in flush contact with the seat ring, the coalescing unit being movable about the pivot point to a storage position in the chamber out of engagement with the seat ring to enable a pipeline pig to be pumped through the ports and the housing.

14. The apparatus according to claim 13, wherein the actuator comprises a spring-biased member that continuously urges the coalescing unit to the operation position, the actuator allowing contact with the coalescing unit by the pig moving in an upstream direction to push the coalescing unit to the storage position.

15. The apparatus according to claim 13, wherein the actuator comprises a powered assembly that when energized moves the coalescing unit from the operational position to the storage position and from the storage position to the operational position.

16. The apparatus according to claim 13, further comprising:
- a sleeve within the chamber, the sleeve having an upstream end that engages the inlet port and a downstream end that engages the seat ring while the coalescing unit is in the storage position to form a continuous tubular bridge for the pig; and
- a piston cooperatively engaged with the sleeve for moving the sleeve in an upstream direction, disengaging from the seat ring, to enable the actuator to move the sleeve to the operational position.

17. An apparatus for use in separating water from hydrocarbon in well fluids, comprising:
- a housing having a chamber joined on opposite sides by an inlet port and an outlet port for coupling the housing into a flow line, the ports being located on a common axis;
- a gate carried in the chamber for movement perpendicular to the axis between a storage position and an operational position, the gate having an aperture that aligns with the ports while in the storage position to enable a pig to pass through; and
- a plurality of electrically conductive tubes carried by and electrically insulated from the gate for connection to a voltage source to coalesce water in well fluid flowing through the tubes, the tubes being located in a flow path between the ports while the gate is in the operational position.

18. The apparatus according to claim 17, further comprising an actuator mounted to the housing for moving the gate between the operational and the storage positions.

19. The apparatus according to claim 17, further comprising a downstream seat ring in the chamber at a junction with the outlet port; and wherein the gate engages the seat ring in both the operational and the storage positions.

20. A method of separating water from hydrocarbon in well fluid flowing through flow line and for periodically cleaning the flow line, comprising:
(a) providing a housing with an inlet port, an outlet port and a separation unit located therein;
(b) connecting the ports of the housing into the flow line, flowing well fluid along a flow path from the inlet port, through the separation unit and out the outlet port;
(c) performing a processing step on the well fluid as the well fluid flows through the separation unit; then, for cleaning the flow line,
(d) moving the separation unit to a position within the housing out of the flow path, and pumping a pipeline pig through the ports along the flow path through housing.

21. The method according to claim 20, wherein:
step (a) comprises providing the separation unit with a plurality of electrically conductive tubes; and
step (c) comprises applying voltage to the tubes to cause water droplets in the well fluid to coalesce.

22. The method according to claim 20, wherein step (d) comprises pivoting the separation unit about a pivot point.

23. The method according to claim 20, wherein step (d) comprises moving the separation unit in a direction perpendicular to the flow path.

* * * * *